US008088834B2

(12) United States Patent
Agarwal et al.

(10) Patent No.: US 8,088,834 B2
(45) Date of Patent: Jan. 3, 2012

(54) PROCESS FOR MAKING POLYBUTYLENE TEREPHTHALATE (PBT) FROM POLYETHYLENE TEREPHTHALATE (PET)

(75) Inventors: Parminder Agarwal, Evansville, IN (US); Kristen Cohoon, Evansville, IN (US); Sandeep Kumar Dhawan, Vienna, WV (US); Robert Russell Galucci, Mt. Vernon, IN (US); Ganesh Kannan, Sr., Evansville, IN (US); Kenneth Frederick Miller, Posey, IN (US); Deepak Ramaraju, Karnataka (IN); Gomatam Raghavan Ravi, Karnataka (IN); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/874,786

(22) Filed: Sep. 2, 2010

(65) Prior Publication Data
US 2011/0003964 A1    Jan. 6, 2011

Related U.S. Application Data

(62) Division of application No. 11/626,674, filed on Jan. 24, 2007, now Pat. No. 7,799,836.

(51) Int. Cl.
*C08J 11/04* (2006.01)
(52) U.S. Cl. ............. 521/40; 521/40.5; 521/47; 521/48; 528/271; 528/272; 528/275; 528/308.2; 528/480; 528/481; 528/488; 528/489; 528/495; 528/502 R
(58) Field of Classification Search .......... 528/271, 528/272, 274, 275, 278, 280, 282, 308.1, 528/308.2, 308.3, 308.5, 480, 481, 488, 489, 528/491, 495, 502 R, 503; 521/40, 40.5, 521/41, 42, 42.5, 47, 48
See application file for complete search history.

(56) References Cited

U.S. PATENT DOCUMENTS

| 2,465,319 | A | 3/1949 | Whinfield et al. |
| 2,720,502 | A | 10/1955 | Caldwell |
| 2,727,881 | A | 12/1955 | Caldwell et al. |
| 2,822,348 | A | 2/1958 | Haslam |
| 3,047,539 | A | 7/1962 | Pengilly |
| 3,671,487 | A | 6/1972 | Abolins |
| 3,701,755 | A | 10/1972 | Sumoto et al. |
| 3,855,277 | A | 12/1974 | Fox |
| 3,864,428 | A | 2/1975 | Nakamura et al. |
| 3,907,868 | A | 9/1975 | Currie et al. |
| 3,907,926 | A | 9/1975 | Brown et al. |
| 3,909,926 | A | 10/1975 | Hutson |
| 3,953,394 | A | 4/1976 | Fox et al. |
| 4,011,285 | A | 3/1977 | Seymour et al. |
| 4,096,156 | A | 6/1978 | Freudenberger et al. |
| 4,128,526 | A | 12/1978 | Borman |
| 4,154,775 | A | 5/1979 | Axelrod |
| 4,161,498 | A | 7/1979 | Bopp |
| 4,264,487 | A | 4/1981 | Fromuth et al. |
| 4,355,155 | A | 10/1982 | Nelsen |
| 4,469,851 | A | 9/1984 | Charles et al. |
| 4,579,884 | A | 4/1986 | Liu |
| 4,598,117 | A | 7/1986 | Liu et al. |
| 4,609,680 | A | 9/1986 | Fujita et al. |
| 5,122,551 | A | 6/1992 | Gallucci et al. |
| 5,266,601 | A | 11/1993 | Kyber et al. |
| 5,326,806 | A | 7/1994 | Yokoshima et al. |
| 5,413,681 | A | 5/1995 | Tustin et al. |
| 5,451,611 | A | 9/1995 | Chilukuri et al. |
| 5,559,159 | A | 9/1996 | Sublett et al. |
| 5,858,551 | A | 1/1999 | Salsman |
| 5,882,780 | A | 3/1999 | Yamamura et al. |
| 6,162,837 | A | 12/2000 | Gerking et al. |
| 6,255,371 | B1 | 7/2001 | Schlosser et al. |
| 6,384,129 | B1 | 5/2002 | Lowry |
| 6,410,607 | B1 | 6/2002 | Ekart et al. |
| 6,515,044 | B1 | 2/2003 | Idel et al. |
| 6,518,322 | B1 | 2/2003 | West |
| 6,706,843 | B1 | 3/2004 | Ishihara et al. |
| 6,794,463 | B2 | 9/2004 | Aramaki et al. |
| 6,887,909 | B2 | 5/2005 | Kawamura et al. |
| 6,927,275 | B2 | 8/2005 | Hirokane et al. |
| 7,179,869 | B2 | 2/2007 | Hirokane et al. |
| 7,183,362 | B2 | 2/2007 | Hirokane et al. |
| 7,388,067 | B2 | 6/2008 | Leemans et al. |
| 7,462,649 | B2 | 12/2008 | Nakao et al. |
| 2002/0012807 | A1 | 1/2002 | Kurian et al. |
| 2005/0176914 | A1 | 8/2005 | Hirokane et al. |

FOREIGN PATENT DOCUMENTS

EP    0683201 A1    11/1995
(Continued)

OTHER PUBLICATIONS

Article: "GE gives plastic bottle recycling a new spin", Chemical Processing.com, Aug. 25, 2006 [online], accessed via the Internet [retrieved on Oct. 16, 2009], URL:<http://www.chemcalprocessing.com/industrynews/2006/056.html>.

(Continued)

*Primary Examiner* — James J Seidleck
*Assistant Examiner* — Frances Tischler
(74) *Attorney, Agent, or Firm* — Cantor Colburn LLP; Diderico van Eyl

(57)    ABSTRACT

The invention relates to a process for making modified polybutylene terephththalate random copolymers from a polyethylene terephthalate component. The invention relates to a three step process in which a diol component selected from the group consisting of ethylene glycol, propylene glycol, and combinations thereof reacts with a polyethylene terephthalate component under conditions sufficient to depolymerize the polyethylene terephthalate component into a first molten mixture; and where the first molten mixture is combined with 1,4-butanediol under conditions that create a second molten mixture that is subsequently placed under subatmospheric conditions that produce the modified polybutylene terephthalate random copolymers. The invention also relates to compositions made from the process.

25 Claims, No Drawings

FOREIGN PATENT DOCUMENTS

| | | |
|---|---|---|
| GB | 1500577 | 2/1978 |
| JP | 2000-256472 A | 9/2000 |
| JP | 2000-256920 A | 9/2000 |
| JP | 2005-89572 A | 4/2005 |
| KR | 2001-0083551 A | 9/2001 |
| WO | 03/066704 A1 | 8/2003 |

OTHER PUBLICATIONS

International Search Report & Written Opinion; International Application No. PCT/US07/002197; International Filng Date: Jan. 26, 2007; Date of Mailing: Jun. 19, 2007; 8 pages.

Pawlak et al., "Characterization of scarp poly(ethylene terephthalate)," European Polymer Journal, 2000, pp. 1875-1884, vol. 36, Elsevier Science Ltd.

S.H. Mansour et al., "Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

International Preliminary Report on Patentability; International Application No. PCT/US2007/002197; International Filing Date Jan. 26, 2007; Date of Issuance Jul. 29, 2008; 7 pages.

PROCESS FOR MAKING POLYBUTYLENE TEREPHTHALATE (PBT) FROM POLYETHYLENE TEREPHTHALATE (PET)

CROSS REFERENCE TO RELATED APPLICATIONS

This application claims priority to U.S. Provisional Application Ser. Nos. 60/777,901 filed on Mar. 1, 2006, and U.S. Provisional Application Ser. Nos. 60/820,467 filed on Jul. 26, 2006, and U.S. Non-provisional application Ser. No. 11/626,674, filed on Jan. 24, 2007, which are incorporated herein by reference in their entirety.

BACKGROUND OF THE INVENTION

Polyethylene terephthalate (also referred to as "PET") is a polyester of terephthalic acid and ethylene glycol and can be obtained by the polycondensation of dimethyl terephthalate with ethylene glycol, and also terephthalic acid with ethylene glycol. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household, consumer and industrial products.

Unfortunately, despite recycling efforts, billions of pounds of PET are still dumped into landfills annually all over the world. Other PET that is not reused is incinerated. The substantial amount of PET that is disposed into landfills creates significant waste. The incineration of PET wastes significant resources that could be used more effectively.

Thermoplastic molding compositions based on polybutylene terephthalate (also referred to as "PBT") and fillers are used in various applications. Although conventional PBT-filler molding compositions are useful to many customers, conventional PBT-filler molding compositions generally cannot be made from recycle sources of PBT due to the lack of availability of PBT recycle streams. PET, unlike PBT, is made in much larger quantities and is partially recovered from consumer wastes. If PET (scrap) materials could be converted to PBT and converted into useful molding compositions, then there would exist a valuable way to meet the unmet need to effectively use underutilized scrap PET in PBT thermoplastic molding compositions.

U.S. Pat. No. 5,451,611 teaches a process for converting waste poly(ethylene terephthalate) to either poly(ethylene-co-butylene terephthalate) or poly(butylene terephthalate) (PBT) by reaction with 1,4-butanediol. In discussing the prior art, U.S. Pat. No. 5,451,611 indicates that in most of the processes it cites, the undesirable byproduct diethylene glycol is formed which contaminates the final product and has to be removed by purification before the recovered products can be reused again. A principal object of U.S. Pat. No. 5,451,611 was to provide a process for converting poly(ethylene terephthalate) waste directly to another high value polymer without breaking down the poly(ethylene terephthalate) to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making "PBT" from PET by reacting PET with 1,4-butanediol. A principal object of U.S. Pat. No. 5,266,601 was to produce PBT containing less than 1.0 wt. % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt. %. U.S. Pat. No. 5,266,601 discloses that "[a]ny diethylene glycol units in the starting PET are also eliminated as completely as possible" (Col. 3, ll 37-38). The patent discloses "adding only enough 1,4BD [1,4-butanediol] to the PET as is necessary to yield a mixture that can be processed well at the reaction temperature." The patent discloses that, depending on the PET used "up to 1.0 mol 1,4-BD per mol PET" can be used. In the instances where compositions contain more than 1 wt. % ethylene glycol, U.S. Pat. No. 5,266,601 presents these compositions in comparative examples. Such compositions are described as having "yellowish" and "slightly yellowish" colors, respectively. It is not clear what standard is used in U.S. Pat. No. 5,266,601 to determine the weight percent reported, as the weight percent can reasonably be defined in as follows: (i) a divalent ethylene radical remaining after removal of hydroxyl groups from ethylene glycol, or (ii) a divalent radical remaining after removal of terminal hydrogen atoms from ethylene glycol. Each moeity has different molecular weight and, as such, each moiety can produce a different value.

Japanese laid-open application 2005-89572 teaches a method for producing polybutylene terephthalate by transesterifying bis(2-hydroxyethyl) terephthalate with 1,4-butanediol in the presence of a transesterification reaction catalyst under the pressure of 1-54 kPa at a final temperature ranging from 200-230° C. and then subjecting the reaction product to polycondensation. In one embodiment, the bis(2-hydroxyethyl) terephthalate is obtained by depolymerizing polyethylene terephthalate with excessive ethylene glycol, and purifying the depolymerized product. The patent teaches that transesterifying bis(2-hydroxyethyl)terephthalate with 1,4-butanediol under reduced pressure imparts favorable results.

Unfortunately, such documents do not meet the long felt need of improved use of PET scrap that is ordinarily incinerated or buried in landfills. U.S. Pat. No. 5,451,611, for instance, does not teach effective processes that enable PET to be able to be broken down into its constituent monomers or oligomers—a feature that is sometimes required by commercial considerations. U.S. Pat. No. 5,451,611 does not provide meaningful guidelines for making compositions functionally similar to PBT containing ethylene glycol in amounts other than trace amounts and which exhibit melting temperatures that are higher than those shown in its examples. Similarly, U.S. Pat. No. 5,266,601 does not provide meaningful details about how to make effective PBT materials with ethylene glycol in amounts more than 1.0 wt. % or with other residues that can be found in some PET scrap. Also, U.S. Pat. No. 5,266,601 does not disclose to relatively more versatile processes that can use excess 1,4-butanediol, relative to the PET scrap used or that do not require that the diethylene glycol be "eliminated as completely as possible." Known technology relating to utilizing PET as scrap materials for making PBT-like materials, in other words, does not provide meaningful solutions that solve the long felt need of new processes for better utilizing PET scrap that is ordinarily incinerated or buried in landfills.

For the foregoing reasons, there is a need to develop improved processes that utilize PET.

For the foregoing reasons, there is a need to develop new processes for making PBT random copolymers having useful performance properties.

For the foregoing reasons, there is a need to develop new articles from molding compositions that utilize PBT derived from PET and that have useful performance properties.

BRIEF DESCRIPTION OF THE INVENTION

The invention relates to a process comprising:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terephthalate component.

In one embodiment, the invention relates to a composition comprising a non-yellow modified polybutylene terephthalate random copolymer made from the process of wherein the modified polybutylene terephthalate random copolymer has an intrinsic viscosity that is more than 0.55 dL/g and wherein the isophthalic acid is present in an amount that is more than 0.85 wt. % or from 0.2 wt. % to 3 wt. %.

These and other features, aspects, and advantages of the present invention will become better understood with reference to the following description and appended claims.

DETAILED DESCRIPTION OF THE INVENTION

The invention is based on the discovery that it is now possible to make a material that is derived from scrap polyethylene terephthalate that performs similarly to "virgin PBT" (PBT that is derived from monomers) in a novel and effective process. Unlike conventional methods for making virgin PBT, the PBT component made by the invention contains, in addition to other materials, ethylene glycol and isophthalic acid groups (components that are not present in virgin PBT). Despite producing a PBT that is structurally different from PBT used in known compositions, e.g., thermoplastic molding compositions, the PBT component of the invention exhibits similar performance properties as a molding composition containing virgin PBT. The compositions can also contain diethylene glycol groups.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector@273 and 295 nanometers and Waters 410 refractomerrefractometer; (iii) Mobile phase: 5% HFIP 95% chloroform; (iv) GPC columns: Polymer Labs PL HFIP gel 250×4.6 mm, (v) Flow rate: 0.3 ml/min; (vi) Injection volume 10 μl; (vii) Polystyrene standards: Polymer Lab's Easical PS-1, 580-7,500,000 Da.

For the sake of clarity, the terms terephthalic acid group, isophthalic acid group, butanediol group, ethylene glycol group in formulas have the following meanings. The term "terephthalic acid group" (R') in a composition refers to a divalent 1,4-benzene radical (-1,4-($C_6H_4$)—) remaining after removal of the carboxylic groups from terephthalic acid. The term "isophthalic acid group" (R") refers to a divalent 1,3-benzene radical (-(-1,3-$C_6H_4$)—) remaining after removal of the carboxylic groups from isophthalic acid. The "butanediol group" (D) refers to a divalent butylene radical (—($C_4H_8$)—) remaining after removal of hydroxyl groups from 1,4-butanediol. The term "ethylene glycol group" (D') refers to a divalent ethylene radical (—($C_2H_4$)—) remaining after removal of hydroxyl groups from ethylene glycol. With respect to the terms "terephthalic acid group," "isophthalic acid group," "ethylene glycol group," "butanediol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group(s)" means the group having the formula (—O(CO) $C_6H_4$(CO)—), the term diethylene glycol group means the group having (—O($C_2H_4$)O($C_2H_4$)—), the term "butanediol group(s)" means the group having the formula (—O ($C_4H_8$)—), and the term "ethylene glycol groups(s)" means the group having formula (—O($C_2H_4$)—).

The modified polybutylene terephthalate component derived from polyethylene terephthalate (PET-derived modified PBT component) is (1) is derived from a polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butanediol derived from a cellulosic material.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based 1,4-butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001).

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof. Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol, diethylene glycol and isophthalic acid. In another embodiment, the residue derived from polyethylene terephthalate further includes cis isomers of 1,3-cyclohexanedimethanol and 1,4-cyclohexanedimethanol, the trans isomer of 1,3-cyclohexanedimethanol, the trans isomer of 1,4-cyclohexanedimethanol and combinations thereof. And in another embodiment, the residue can be a mixture of ethylene glycol, diethylene glycol, and isophthalic acid groups, cis isomers of cyclohexanedimethanol, trans isomers of cyclohexanedimethanol, and combinations thereof. In one embodiment, the residue derived from polyethylene terephthalate includes mixtures of ethylene glycol, diethylene glycol, and a cobalt-containing compound. Such cobalt-containing compound mixture can also contain isophthalic acid groups.

In one embodiment, for instance, the modified polybutylene terephthalate component derived from polyethylene terephthalate (PET-derived modified PBT component, or modified polybutylene terephthalate copolymers containing residues derived from polyethylene terephthalate) that is made by the process of the invention is a random copolymer containing groups selected from the following groups:

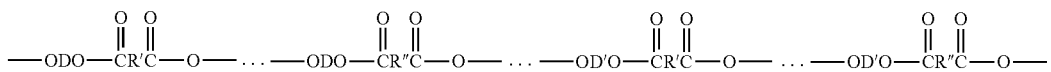

where
R' is a terephthalic group (-1,4-($C_6H_4$)—);
R" is an isophthalic acid group (-1,3-($C_6H_4$)—);
D is a butanediol group (—($C_4H_8$)—)
D' is an ethylene glycol group (—($C_2H_4$)—).

The modified polybutylene terephthalate copolymers containing residues derived from polyethylene terephthalate can also contain diethylene glycol groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole %. (0.02 to 2 wt. %). In one embodiment, the PET-derived modified PBT component has an ethylene glycol content that is more than 0.85 wt. %. In another embodiment, compositions made by our process can contain ethylene glycol is present in an amount ranging from 0.1 wt. % to 2 wt. %. The modified PBT component can also contain diethylene glycol in an amount ranging from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene terephthalate random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount ranging from 0.1 to 10 mole %, based on 100 mole % of glycol of the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymer having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexane-dimethanol and ethylene glycol, copolyesters of terephthalic acid with comonomers containing cyclohexanedimethanol and ethylene glycol, polybutylene terephthalate, poly-xylylene terephthalate, polydianol terephthalates, polybutylene terephthalate, polytrimethylene terephthalate, polyester naphthalates, and combinations thereof.

In one embodiment, our process (a) reacts (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation. Then, the process adds 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof. The process then involves increasing the temperature of the second molten mixture under subatmospheric conditions and agitation to a temperature from 240° C. to 260° C., thereby forming a modified random polybutylene terephthalate copolymer containing at least one residue derived from the polyethylene terephthalate component.

The modified polybutylene terephthalate random copolymer component can contain a component selected from the group consisting of (1), (2), (3), (4), (5), (6), and combinations thereof; components (1), (2), (3), (4), (5), (6) having the following formulae:

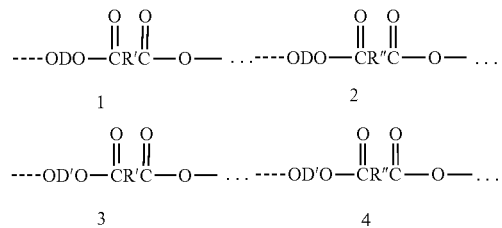

-continued

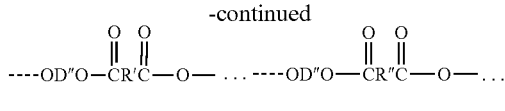

wherein
(R') is a terephthalic acid group (-1,4-($C_6H_4$)—);
R" is an isophthalic acid group (-1,3-($C_6H_4$)—);
D is a butanediol group (—($C_4H_8$)—);
D' is an ethylene glycol group (—($C_2H_4$)—); and
D" is a propylene glycol group (—($C_3H_6$)—).

This three step embodiment provides an advantageous way for producing modified PBT random copolymers from PET. The diol component used in step (a) of the three step embodiment can be selected from ethylene glycol, propylene glycol, and combinations thereof. It will be appreciated that the molten mixture that forms when the polyethylene terephthalate component is depolymerized can vary, depending on how it is depolymerized. When the polyethylene terephthalate component is depolymerized with ethylene glycol and the first molten mixture contains oligomers containing ethylene terephthalate moieties, oligomers containing ethylene isophthalate moieties, oligomers containing diethylene terephthalate moieties, oligomers containing diethylene isophthalate moieties, covalently bonded oligomeric moieties containing at least two of the foregoing moieties, ethylene glycol, and combinations thereof. When the polyethylene terephthalate component is depolymerized with propylene glycol and the first molten mixture contains oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof. In another embodiment, the polyethylene terephthalate can be depolymerized with mixtures of ethylene glycol and 1,4-butane diol. When propylene glycol is used to depolymerize PET, it is understood that either 1,3 or 1,2 propylene glycol could be used.

The diol component can be present in step (a) at a molar amount that is at least half the amount of ethylene glycol moieties present in the polyethylene terephthalate component. In one embodiment, the diol component selected from the group consisting of ethylene glycol, propylene glycol, and combinations thereof is present in step (a) at a molar amount that is at least 25% of the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three step embodiment can be added at a molar amount that is in excess relative to the molar amount of butanediol moieties incorporated into the modified polybutylene terephthalate random copolymer component obtained in step (c). The 1,4-butanediol can be added in step (b) in a molar amount that is in at least 1.2 times molar excess relative to the molar amount of butanediol moieties incorporated into the modified polybutylene terephthalate random copolymer component obtained in step (c).

During the process the compounds used in the process can be reused and/or collected. In one embodiment, the (1) diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. In another embodiment, the diol component selected from the group consisting of ethylene glycol, propylene glycol, and combinations thereof and 1,4-butane diol are separated and the 1,4-butanediol is refluxed back into the reactor in step (b).

Step (b) is practiced for a sufficient period of time to reduce at least 65% of ethylene glycol from the second molten mixture. The duration of step (b) can also vary. In one embodiment, step (b) lasts at least 45 minutes to several hours, or more. The pressure at which step (b) is carried out can vary. In one embodiment, wherein step (b) is carried out in atmospheric conditions. In another embodiment, step (b) is carried out in subatmospheric conditions. In another embodiment, step (b) is carried out with excess 1,4-butanediol and at a pressure ranging from 30 to 150 kPa absolute. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step (c) of the three step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. In another embodiment, step (c) is carried out at a pressure that is less than 1.0 mbar.

The three step process can be carried out in the same reactor. Alternatively, the three step process can be carried out in at least two reactors.

In another embodiment, the three step process can include the step of adding a basic compound during step (a), step (b), step (c), and combinations thereof, and thereby further reduce THF production. The basic compound, as in the two step embodiment, can contain an alkali or alkaline earth metal or aluminium compound and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminum bicarbonates, and combinations thereof.

The amount of the basic compound used is generally at least 0.1 ppm. In one embodiment, the amount of the basic compound is from 0.1 to 50 ppm. In another embodiment, the amount of the basic compound ranges from 1 to 10 ppm.

The addition of the basic compound such as an alkali metal compound can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more. In another embodiment, the THF is reduced from at least 10% to 50%. Advantageously, the invention includes an embodiment in which the 1,4-butanediol is derived from biomass. In one embodiment, the biomass is a grain selected from the group consisting of corn, wheat, and combinations thereof.

In this embodiment, the 1,4-butanediol is used as described above. When this embodiment is used, articles can further reduce the use of $CO_2$ emissions that are ordinary generated when 1,4-butanediol is made from monomers.

Advantageously the three step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the PET-derived modified PBT may contain an additional step in which the PBT formed from the molten mixture is subjected to solid-state polymerization. Solid-state polymerization generally involves subjecting the PBT formed from the molten mixture to an inert atmosphere and heating to a temperature for a sufficient period of time to build the molecular weight of the PBT. Generally, the temperature to which the PBT is heated is below the melting point of the PBT, e.g., from 5 to 60° C. below the melting point of the PBT. In one embodiment, such a temperature may range from 150 to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

Remarkably, despite having residues derived from polyethylene terephthalate, e.g., ethylene glycol and isophthalic acid groups (groups that have long been regarded as undesired components in virgin PBT), the PET-derived modified PBT component exhibits useful properties. It is important to be aware that the PET derived PBT compositions of the invention are not "recycled," as the term is ordinarily used. That is, the compositions are not reprocessed PBT or PET. Rather, they are entirely new materials made from PET, a material that is fundamentally different from PBT. Also, the PET-derived modified PBT is structurally different from "virgin" PBT. Virgin PBT, for instance, is a non-random homopolymer. The modified PBT of this invention is a random copolymer. The physical properties of the PET-derived modified PBT will now be discussed.

The physical properties of the PET-derived modified PBT component can vary, depending on factors such as the performance properties that are required, the equipment used, process parameters, and the like. The intrinsic viscosity (IV) of the PET-derived modified PBT is at least 0.56 dL/g. In another embodiment, the intrinisic viscosity ranges from 1 to 1.3 dL/g. In another embodiment, the intrinsic viscosity ranges from 0.95 to 1.05 dL/g. All intrinsic viscosities in this application refer to those viscosities measured in a solution of 60 wt. % phenol and 40 wt. % 1,1,2,2-tetrachloroethane at 25° C.

The melting point of the PET-derived modified PBT is at least about 200° C. or 210° C. In another embodiment, the melting point ranges from 204° C. to 218° C. In another embodiment, the melting point ranges from 211° C. to 223° C. The crystallization temperature of the PET-derived modified PBT is at least 150° C. In another embodiment, the crystallization temperature ranges from 162° C. to 175° C. In another embodiment, the crystallization temperature ranges from 164° C. to 178° C.

The flexural modulus of the PET-derived modified PBT is at least 1000 MPa. In another embodiment, the flexural modulus ranges from 1000 MPa to 5000 MPa. In another embodiment, the flexural modulus ranges from 2400 to 2500 MPa. The tensile strength (@yield) of the PET-derived modified PBT is at least 30 MPa. In another embodiment, the tensile strength ranges from 30 MPa to 100 MPa. In another embodiment, the tensile strength ranges from 51 to 53 MPa. The tensile elongation (@yield) of the PET-derived modified PBT is at least 2%.

In another embodiment, the tensile elongation (yield, break) ranges from 2% to 10%. In another embodiment, the tensile elongation (@yield) ranges from 3 to 3.3%. The heat deflection temperature of the PET-derived modified PBT generally ranges from at least 45 of 60° C. at 1.82 MPa for 3.2 mm bars. In another embodiment, the heat deflection temperature ranges from 45° C. to 65 or 75° C. In another embodiment, the heat deflection temperature ranges from 60 to 70° C. The notched izod strength temperature of the PET-derived modified PBT is at least 20 J/m. In another embodiment, the notched izod strength ranges from 20 J/m to 60 J/m. In another embodiment, the notched izod strength ranges from 27 to 45 J/m.

The molecular weight of the PET-derived modified PBT is generally at least 3000 g/mol. In one embodiment, the molecular weight of the PET-derived modified PBT ranges from 18000 to 42000 g/mol. In another embodiment, the molecular weight of the PET-derived modified PBT ranges from 30000 to 42000 g/mol.

The process can further comprise increasing the molecular weight of the polymer obtained in step (c) by subjecting the polymer formed in step (c) to solid state polymerization. When subjected to solid state polymerization step, the molecular weight of the PET-derived modified PBT is generally at least 15000 g/mol. In one embodiment, the molecular weight of the PET-derived modified PBT that has been subjected to solid state polymerization ranges from 18000 to 42000 g/mol. In another embodiment, the molecular weight of the PET-derived modified PBT that has been subjected to solid state polymerization ranges from 20000 to 50000 g/mol.

In addition to providing a novel process for making PBT from PET, the invention includes embodiments directed to compositions made from such a process. In one embodiment, the PBT formed is a composition that includes a white, non-yellow, PET-derived modified PBT containing isophthalic acid and ethylene glycol groups, such that the composition has an intrinsic viscosity that is at least 0.55 dL/g or more than 0.55 dL/g and the isophthalic acid and the ethylene glycol are present in an amount that is more than 0.85 wt. %. The intrinsic viscosity can vary and, advantageously, the process makes it possible to make polymers with a wide range of higher intrinsic viscosities, e.g., from 0.55 to 1.3 dL/g, or 1.5 dL/g or higher. In another embodiment, compositions made by our process can contain ethylene glycol is present in an amount ranging from 0.1 wt. % to 2 wt. %.

In use, a polyethylene polyethylene terephthalate component selected from the group consisting of polyethylene terephthalate and polyethylene terephthalate copolymers reacts with a diol component selected from the group consisting of ethylene glycol propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation. It will be appreciated that our invention includes embodiments in which the polyethylene polyethylene terephthalate component is depolymerized with 1,4-butane diol. In one embodiment, the polyethylene terephthalate component can be depolymerized with mixtures of 1,4-butane diol and ethylene glycol.

1,4-butanediol is then added to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof.

Temperature is then increased the temperature of the second molten mixture under subatmospheric conditions and agitation to a temperature from 240° C. to 260° C., thereby forming a modified random polybutylene terephthalate copolymer containing at least one residue derived from the polyethylene terephthalate component.

In another embodiment, a suitable amount of a polyethylene terephthalate reacts with an excess amount of a diol component selected from the group of ethylene glycol, 1,4-butane diol, and combinations thereof, at a pressure that is at least atmospheric pressure in the presence of a catalyst component at a temperature ranging from 180° C. to 230° C. A suitable inert atmosphere is selected and the conditions are such that the polyethylene terephthalate depolymerizes into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof.

The polyethylene terephthalate component and the added diol such as 1,4-butanediol are combined in the liquid phase under agitation and the added diol such as 1,4-butanediol is continuously refluxed back into the reactor during this step. If the added diol is different from 1,4-butanediol, this step is preferably modified to include the step of removing the added diol under reduced pressure followed by incorporation of 1,4-butanediol into the reaction mixture. When the molten mixture has formed, the molten mixture is subjected to subatmospheric pressure and the temperature of the system increases to a temperature ranging from 250° C. to 260° C., and thereby forming a PET-derived modified PBT component containing the isophthalic acid groups and ethylene glycol groups integrated into its backbone. Excess butanediol, ethylene glycol, and THF are removed during step (b) step (b) is carried out under agitation.

The steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out.

The amounts of PET-derived modified PBT that can be made from the invention can vary with factors such as production needs, equipment, available materials, and the like. Nonetheless, the invention contains embodiments in which the amounts are sufficiently high for various commercial applications. In one embodiment, the process produces at least 200 kilograms PET-derived modified PBT/per hour. In another embodiment, the process can produce from 500 to 1000 kilograms PET-derived modified PBT/per hour. In another embodiment, the process can from produce from 1000 to 2000 kilograms PET-derived modified PBT/per hour.

Although the foregoing description has been directed to processes for making modified PBT materials from PET, and respective processes for making such materials, the scope of the invention includes processes for making polyesters other than PBT from PET. Examples of other polyesters include polycyclohexane terephthalate glycol (PCTG) polycyclohexane terephthalate (PCT), polyethylene terephthalate glycol, (PETG); polytrimethylene terephthalate (PTT), poly-xylene terephthalate (PXT), polydianol terephthalate (PDT).

As such, in one embodiment, the invention includes a process for making PTT that involves the steps of (a) reacting (i) a polyethylene terephthalate component with (ii) a 1,3-propanediol at a pressure that is at least atmospheric pressure in the presence of a catalyst component at a temperature ranging from 180° C. to 260° C., under an inert atmosphere, thereby depolymerizing the polyethylene terephthalate component into a molten mixture containing polyethylene terephthalate oligomers, polypropylene terephthalate oligomers, 1,3-propanediol, and ethylene glycol;

wherein the polyethylene terephthalate component and the 1,3-propanediol are combined in the liquid phase under agitation and the 1,3-propanediol is refluxed back into the reactor during step (a);

(b) subjecting the molten mixture to subatmospheric pressure and increasing the temperature of the molten mixture to a temperature ranging from 240° C. to 270° C., and thereby forming a PET-derived PTT component selected from one or more of the following groups:

wherein
R' is a terephthalic acid group (-1,4-($C_6H_4$)—);
R" is an isophthalic acid group (-1,3-($C_6H_4$)—);
D is a divalent propylene radical (—($C_3H_6$)—); and
D' is a divalent ethylene radical (—($C_2H_4$)—);
wherein excess propanediol and ethylene glycol are removed during step (b) and wherein step (b) is carried out under agitation.

The invention provides previously unavailable advantages. For instance, the invention provides a process that is relatively simple and effective at producing relatively large amounts of PET-derived modified polyesters, such as modified PBT efficiently. The process of the invention requires specific conditions found to be critical for avoiding disadvantages of processes disclosed in the prior art.

Further, the process for making the PET-derived random, modified PBT copolymers can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used. Instead, rather a PET component, e.g., polyester scrap, is used. The process to make DMT or TPA from crude oil is highly energy intensive and as a result, substantial emissions of $CO_2$ to the atmosphere occur from burning of non-renewable energy sources. By not using DMT or TPA to make the PET derived PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and used instead of ordinary ethylene glycol in manufacturing.

Additionally, when the source of BDO is a biomass derived feedstock such as succinic acid, the carbon dioxide savings are further increased for two reasons. Bio derived succinic acid is made form sugars or other bio derived hydrocarbons that are derived from atmospheric carbon vs fossil fuel carbon sources. This reduces the environmental impact of the polymer derived from BDO based on succinic acid from biomass sources. Furthermore, the fermentation to yield succinic acid requires carbon dioxide as an input thus leading to further carbon dioxide reductions.

Advantageously, a modified polybutylene terephthalate random copolymer can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$ expressed in kg, that is created when the composition is made with polybutylene terephthalate that is derived from monomers. Generally, the modified PBT random copolymers have a reduced $CO_2$ emissions index that is more than approximately 1.3 kg, and can range from 1.3 kg to 2.5 kg.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil.

These results can be derived and verified by using material and energy balance calculations (calculations that are well known in the chemical engineering art) and comparing the amount of energy used to make modified PBT random copolymers from PET and the amount of energy used to make PBT from terephthalic acid or dimethyl terephthalate.

The invention is further described in the following illustrative examples in which all parts and percentages were by weight unless otherwise indicated.

Examples 1-9

The overall quantity of individual materials taken and the reaction scale used are indicated in Table 1.

TABLE 1

Amounts of raw materials taken and reaction scale for Examples 1-9[1]

| Example no. | Scale of reaction PBT amount prepared (g) | Overall ratio of principal raw materials | | Depolymerization stage | | | Transesterification stage | | |
|---|---|---|---|---|---|---|---|---|---|
| | | EG:PET mole ratio | BDO:PET mole ratio | EG taken (g) | PET taken (g) | Catalyst (ppm) | BDO taken (g) | Catalyst, Ti (ppm) | Cocatalyst (ppm) |
| 1 | 8000 | 1.27 | 3.6 | 2800 | 7000 | No added catalyst | 11800 | (100) | — |
| 2 | 8000 | 1.27 | 3.6 | 2800 | 7000 | Sb (100) | 11800 | (50 + 50)* | — |
| 3 | 8000 | 1.5 | 3.6 | 3400 | 7000 | Ti (50) | 11800 | (50 + 50)* | — |

TABLE 1-continued

Amounts of raw materials taken and reaction scale for Examples 1-9[1]

| | | Overall ratio of | Depolymerization stage | | | Transesterification stage | | |
| | Scale of reaction | principal raw materials | EG | PET | | BDO | | |
| Example no. | PBT amount prepared (g) | EG:PET mole ratio | BDO:PET mole ratio | taken (g) | taken (g) | Catalyst (ppm) | taken (g) | Catalyst, Ti (ppm) | Cocatalyst (ppm) |
|---|---|---|---|---|---|---|---|---|---|
| 4 | 8000 | 1.5 | 2.4 | 3400 | 7000 | Ti (50) | 8000 | (50 + 50)* | — |
| 5 | 234.2 | 1.5 | 3.6 | 95.9 | 204.1 | Ti (50) | 344.4 | (100) | — |
| 6 | 234.2 | 1.5 | 3.6 | 95.9 | 204.1 | Ti (50) | 344.9 | (100) | — |
| 7 | 234.2 | 1.5 | 3.6 | 95.9 | 204.1 | Ti (50) | 344.4 | (100) | — |
| 8 | 234.2 | 1.5 | 3.6 | 95.9 | 204.1 | Ti (50) | 344.3 | (100) | NaOMe (13.8) |
| 9 | 234.2 | 1.5 | 3.6 | 95.9 | 204.1 | Ti (50) | 344.1 | (100) | NaOMe (13.8) |

[1]No additional ingredient was added at the polymerization stage.
*The catalyst is added in two parts- first part at atm. pressure and the second part at 80 kPa Green colored PET scrap from bottles was obtained from a commercial source. In the scrap cleaning process, the PET scrap was cleaned manually involving first a hot water wash followed by manual sorting to separate colored bottles and PVC bottles, crushing, hydrofloatation to separate PP, labels, caps etc., alkali wash to remove glue, and finally a demineralized water wash to remove alkali followed by drying. The resulting PET flakes were used as the main raw material in the depolymerization step. The post consumer recycle PET flakes had an iv specification of 0.68 to 0.78 dl/g and a melting point specification of 245° C. to 255° C. The PVC content was less than 10 ppm by specification. The butanediol was obtained from BASF and had a purity specification of >99.5 wt. %. The ethylene glycol was obtained from Merck Co. and had a purity specification of >99.5 wt. % The TPT catalyst used was the commercial Tyzor grade available from Dupont.

Depolymerization (Glycolysis) with Ethylene Glycol—Preparation of First Mixture

Depolymerization of PET flakes was carried out at a mole ratio of PET ('mer' repeat unit) to EG in the range of 1:0.8 to 1:2.0 to make the depolymerization product. The reaction was conducted in the presence of catalyst (titanium, antimony or tin compounds (range from 50 to 125 ppm)). The process was carried out under a pressure in the range 1.0 bar –6 bar and at a temperature of 200 Deg C. to 260 Deg C.). The total time of depolymerization was in the range from 20 to 120 min and preferably 30 to 100 min. This is further followed by filtration of the mass to remove black specs and other insoluble impurities. The resulting mass was called the first mixture. The depolymerization reaction conditions employed for examples 1-9 are presented in Table 2.

TABLE 2

Process Conditions for Depolymerization with ethylene glycol

| Example No. | Pressure (kPa) | ° C. | Depolymerization time (min) |
|---|---|---|---|
| 1 | 350 | 230 | 30 |
| 2 | 350 | 232 | 65 |
| 3 | 350 | 232 | 95 |
| 4 | 350 | 230 | 95 |
| 5 | 350 | 235 | 90 |
| 6 | 350 | 235 | 90 |
| 7 | 350 | 235 | 90 |
| 8 | 350 | 235 | 90 |
| 9 | 350 | 235 | 90 |

Transesterification—Preparation of Second Mixture (at Atmospheric Pressure)

Transesterification was done by reacting the first mixture with BDO with or without cocatalyst. The cocatalyst in some of the examples was sodium methoxide of (10-14 ppm). The BDO was taken in excess over the stoichiometric requirement and the mole ratio of excess to stoichiometric requirement ranged from 2.0 to 4.0. The reaction was conducted in the presence of additional amount of catalyst (50-120 ppm of Ti, Sn or Sb catalysts or combinations thereof) at temperature range of 200 to 245 Deg C. and more preferably 210 to 235 Deg C. at atmospheric pressure for 10-40 min and more preferably 15-30 min. During this period, the vapors were passed through a distillation column wherein the EG and THF were removed after separation from BDO which was refluxed back into the reactor. This resulted in the reaction mass called second mixture. The second mixture was not characterized and the reaction was continued as given below to form the third mixture.

Preparation of Third Mixture (at Pressures in the Range from 95 kPa to 50 kPa)

In Examples 1-4, the second mixture was subjected to a pressure initially in the range of 95 to 80 kPa for a period of 10-40 min and more preferably 15-30 min. During this period, the temperature was controlled between 190 and 235 (C) and more preferably between 190 and 220 deg C. and the vapors were subjected to distillation and much of the BDO of condensed vapors was refluxed back accompanied by the removal of EG, THF and minor amounts of BDO. At this stage, 80% of total EG present both as free and as bound was removed by distillation during transesterification. Subsequently, the pressure was reduced gradually to a range from 80 to 50 kPa and the temperature was maintained between 190 and 235 deg C. and more preferably between 190 and 220 deg C. The total time for transesterification was maintained between 30 to 150 min and preferably between 90 to 120 min. EG, THF and minor amount of BDO were removed by distillation and as before, much of the BDO was continuously refluxed back into the reactor. In examples 5-9, the pressure was lowered from atmospheric to 60 kPa slowly, and held at 60 kPa for a period from 20-150 minutes and more preferably from 30-60 minutes. The temperature was maintained between 190 and 235 deg C. and more preferably between 190 and 220 deg C. and the vapors were subjected to distillation and much of the BDO of condensed vapors was refluxed back accompanied by the removal of EG, THF and minor amounts of BDO. This resulted in the formation of a third mixture. The reaction conditions employed and the amounts of various ingredients collected in the distillate at the end of transesterification are shown in Table 3.1

TABLE 3

| | | | | Transesterification conditions | | | | |
|---|---|---|---|---|---|---|---|---|
| | Multiple pressure | | Time in Min for | | Distillate composition | | | |
| Example | conditions from Atm to given kPa | Temp Deg. C. | respective pressure conditions | THF Wt % | WATER Wt % | EG Wt % | BDO Wt % | QTY of OVHD gms |
| 1 | Atm, 50 | 194-222 | 120, 29 | 19.47 | 7.06 | 42.87 | 30.60 | 10222 |
| 2 | Atm, 80, 50 | 193-223 | 75, 30, 30 | 18.91 | 8.14 | 42.79 | 30.16 | 8364 |
| 3 | Atm, 80, 50 | 193-221 | 60, 30, 30 | 13.34 | 4.76 | 47.67 | 34.23 | 10324 |
| 4 | Atm, 80, 50 | 191-219 | 65, 30, 30 | 14.38 | 7.18 | 56.36 | 22.08 | 8430 |
| 5 | 60 | 194-217 | 60 | 18.29 | 4.85 | 48.92 | 27.95 | 302.04 |
| 6 | 60 | 194-218 | 45 | 9.48 | 4.35 | 48.44 | 37.73 | 227.12 |
| 7 | 60 | 196-203 | 30 | 6.08 | 2.96 | 52.04 | 38.93 | 197.11 |
| 8 | 60 | 193-214 | 30 | 3.51 | 3.71 | 52.43 | 40.36 | 240.72 |
| 9 | 60 | 193-217 | 45 | 4.84 | 3.34 | 46.48 | 45.34 | 252.36 |

Recycling the BDO enables a favorable BDO to EG ratio in the transesterification reactor, and improves productivity by lowering the transesterification time. EG was reused in the depolymerization step and BDO was reused in the transesterification step. The THF and water mixture were sent to storage vessels.

Polycondensation

Polycondensation using the third mixture was done at a temperature in the range from 230 to 265 Deg C. and preferably 245 to 255 Deg C. The pressure was gradually reduced to a level of 0.01 kPa to 1 kPa to enable molecular weight build-up. The reaction was conducted within a time span of 45 to 120 min and preferably 45 to 75 min. During polycondensation, excess BDO and residual EG was removed, along with THF and Water. The vapor byproducts were subjected to distillation to separate EG, BDO, THF and water mixture. The final polymer product (PBT) had an I.V. ranging in between 0.5 and 1.5 dl/gm and EG and DEG content less than 0.4 wt. % each based on final polymer. Typically, the IPA content was less than 2% in the polymer. The melting point of the final polymer was in the range of 215 to 222 Deg C. The experimental conditions used for polycondensation and the composition of the distillates are shown in Table 4.

TABLE 4

| | | | | Polycondensation Reaction conditions | | | | |
|---|---|---|---|---|---|---|---|---|
| | | | | | Overhead Distillate composition | | | Qty of |
| Example | Pressure range kPa | Temp Deg C. | Time min | THF Wt % | Water Wt % | EG Wt % | BDO Wt % | Overhead (g) |
| 1 | 50-0.13 | 253 | 84 | 2.578 | 2.87 | 15.76 | 78.79 | 2980 |
| 2 | 50-0.11 | 253 | 87 | 0.496 | 1.4 | 13.69 | 84.42 | 5270 |
| 3 | 50-0.11 | 253 | 75 | 1.863 | 2.34 | 16.26 | 79.54 | 2756 |
| 4 | 50-0.13 | 252 | 63 | 1.755 | 6.07 | 30.72 | 61.45 | 1634 |
| 5 | 60-0.05 | 255 | 60 | 4.312 | 11.220 | 5.542 | 78.925 | 115.15 |
| 6 | 60-0.08 | 255 | 90 | 3.799 | 3.323 | 16.075 | 76.803 | 132.13 |
| 7 | 60-0.04 | 254 | 75 | 3.182 | 3.116 | 23.397 | 70.305 | 204.7 |
| 8 | 60-0.06 | 254 | 75 | 2.353 | 3.578 | 16.811 | 77.257 | 166.18 |
| 9 | 60-0.05 | 255 | 90 | 1.794 | 5.197 | 22.665 | 70.343 | 153.98 |

Table 5 provides the data on the composition of the polymers obtained through $^1$H NMR analysis for examples 1-9.

Comparative Examples C. Ex. 1 and C. Ex. 2

Comparative examples C. Ex. 1 and C. Ex. 2 are repeat experiments carried out based on the process disclosed in the prior art, U.S. Pat. No. 5,451,611 assigned to CSIR. In '611 patent the distinction between depolymerization step and transesterification was not made. The quantity of materials used and process conditions employed are shown in Tables 5(a) and 5(b).

TABLE 5(a) and 5(b)

Materials and process conditions employed for C. Ex. 1 and C. Ex. 2.

| | | | | | Transesterification | | | | |
|---|---|---|---|---|---|---|---|---|---|
| Comparative Example | BDO:PET | PBT Qty gms | PET Taken Gms | BDO taken gms | Catalyst (Ti) ppm | Cocatalyst ppm | TE Press kPa | TE Temp Deg C. | TE Time min |
| C. Ex. 1 | 2.95 | 10000 | 8340 | 11550 | Ti 100 | — | atm, 50 | 200-226 | 255, 30 |
| C. Ex. 2 | 2.95 | 10000 | 8340 | 11550 | Ti 100 | — | atm, 50 | 198-225 | 245, 30 |

TABLE 5(b)

| Polycondensation | | |
|---|---|---|
| Press kPA | Temp Deg C. | Time min |
| 50-0.12 | 254 | 83 |
| 50-0.11 | 254 | 84 |

TABLE 6

Composition of the PBT derived from PET resin (NM = not measured)

| Ex, | Isophthalic Groups Mole % | Terephthalic Groups Mole % | BDO Mole % | DEG groups Mole % | EG groups Mole % | Na ppm | Sb ppm | Sn ppm | Ti ppm | Residue Equivalents** |
|---|---|---|---|---|---|---|---|---|---|---|
| 1 | 1.14 | 48.88 | 48.88 | 0.24 | 0.86 | 1107.6 | 152.4 | 157.4 | 97.4 | 4.5 |
| 2 | 1.24 | 48.67 | 49.03 | 0.36 | 0.70 | NM | NM | NM | NM | 4.6 |
| 3 | 1.14 | 48.75 | 49.12 | 0.24 | 0.73 | 1138.9 | 140.3 | 125.1 | 101.1 | 4.2 |
| 4 | 1.20 | 48.26 | 47.89 | 0.19 | 2.46 | NM | NM | NM | NM | 7.7 |
| 5 | 1.23 | 48.59 | 49.26 | 0.06 | 0.86 | NM | NM | NM | NM | 4.3 |
| 6 | 1.13 | 49.04 | 49.10 | 0.12 | 0.61 | 1535.0 | 130.7 | 130.5 | 74.8 | 3.7 |
| 7 | 1.36 | 48.90 | 48.48 | 0.18 | 1.08 | NM | 203.8 | 235.6 | 111.8 | 4.6 |
| 8 | 1.06 | 48.73 | 48.98 | 0.24 | 0.98 | NM | 156.5 | 176.6 | 93.1 | 4.6 |
| 9 | 1.38 | 48.64 | 48.88 | 0.12 | 0.98 | NM | 95.1 | 115.8 | 167.5 | 5.0 |
| C. Ex. 1. | 1.41 | 48.68 | 47.16 | 0.29 | 2.46 | — | — | — | — | 8.3 |
| C. Ex. 2. | 1.46 | 48.66 | 46.36 | 0.29 | 3.23 | — | — | — | — | 10 |

**Residual Equivalents relative to the total of 100 equivalents of diol and 100 equivalents of diacid groups ((isophthalic acid groups + DEG groups + EG groups) × 2)

Example 4 also had a higher mole % of EG incorporated than any of the other examples as seen in Table 6. As seen in Table 1, for the example 4, the BDO:PET ratio was 2.4, whereas for the examples 5-9 as well as examples 1-3, the BDO:PET ratio employed was 3.6. Mole % are expressed on the base of a total of 50 mole % for the total diol portion and 50 mole % for the total diacid content of the polymer.

TABLE 7

THF amount formed

| Example | PBT prepared, g | THF formed, g | Ratio of (THF/PBT) as % |
|---|---|---|---|
| 1 | 8000 | 2067 | 25.84 |
| 2 | 8000 | 1608 | 20.10 |
| 3 | 8000 | 1429 | 17.86 |
| 4 | 8000 | 1241.0 | 15.51 |
| 5 | 234.2 | 60.2 | 25.70 |
| 6 | 234.2 | 26.5 | 11.32 |
| 7 | 234.2 | 18.5 | 7.90 |
| 8 | 234.2 | 12.4 | 5.29 |
| 9 | 234.2 | 15.0 | 6.40 |
| C. Ex. 1. | 10000 | 4190 | 41.90 |
| C. Ex. 2. | 10000 | 4355 | 43.55 |

The examples, as per Table 7 show that the process is versatile and can produce modified polybutylene terephthalate copolymers at different THF production levels. The process of the invention enables production of much lesser formation of THF than the comparative examples C. Ex. 1 and C. Ex. 2 (see Table 7). Also, Examples 8 and 9 where sodium methoxide additive was used, the THF amount formed was the lowest % relative to the amount of PBT made. Also from the examples 1-9, a lower % of THF was formed wherever the time of transesterification as shown in Table 3 was lower.

TABLE 8

Differential scanning calorimetry, viscosity and molecular weight Characterization data for the examples 1-9 and comparative examples C. Ex. 1 and C. Ex. 2

| Example | DSC Analysis | | | | Viscosity | Molecular Weight | | |
|---|---|---|---|---|---|---|---|---|
| | Tm Deg C. | Tc Deg C. | DH fusion kJ/kg | DH cryst kJ/kg | IV dl/gm | Mn Daltons | Mw Daltons | PDI Daltons |
| 1 | 220.79 | 176.5 | 37.26 | 47.26 | 0.803 | 24180 | 63719 | 2.64 |
| 2 | 221.45 | 178.78 | 29.69 | 39.41 | 0.798 | 24221 | 62776 | 2.59 |
| 3 | 221.1 | 180.99 | 28.73 | 39.31 | 0.805 | 24495 | 63277 | 2.58 |
| 4 | 217.26 | 171.58 | 27.28 | 36.54 | 0.794 | 24006 | 63791 | 2.66 |
| 5 | 220.42 | 186.13 | 38.34 | 49.47 | 0.720 | 31850 | 68168 | 2.14 |
| 6 | 220.42 | 184.86 | 32.03 | 43.13 | 0.710 | 24675 | 79596 | 3.23 |
| 7 | 219.16 | 183.64 | 35.51 | 42.51 | 0.740 | 29505 | 77380 | 2.62 |
| 8 | 220.45 | 184.76 | 35.68 | 44.18. | 0.690 | 25053 | 80788 | 3.22 |
| 9 | 220.47 | 183.98 | 35.54 | 43.99 | 0.720 | 22609 | 78916 | 3.49 |
| C. Ex. 1 | 214.42 | 170.19 | 31.33 | 40.85 | 0.787 | 22877 | 62481 | 2.73 |
| C. Ex. 2 | 212.76 | 169.34 | 27.01 | 37.73 | 0.755 | 20553 | 59986 | 2.92 |

Example 10

Solid State Polymerization

In order to get a high value of intrinsic viscosity (IV) for the PET derived PBT, a low viscosity sample from example 4 (IV=0.79) was subjected to solid state polymerization in a tumbling reactor at 100 mbar pressure at a temperature of 190-220 deg C. for about 48 to 72 h. The intrinsic viscosity was checked intermittently during the viscosity build-up and a product with a final intrinsic viscosity value of 1.19 was obtained. This example 10 is illustrative of a process for obtaining polymer samples of PET derived PBT of high intrinsic viscosity.

Example 11

Synthesis of Butanediol from Corn Based Succinic Acid

The purpose of this example is to show that BDO can be derived from biomass.
Techniques/Procedures
Bio-succinic acid for the experiments performed in example 19 was sourced from Diversified Natural Products-.BDO from bio Succinic acid was synthesized in a two-step process as below:
Step (1): Esterification of Succinic Acid to Diethyl Ester:
In a 2.0 liter RB flask on an oil bath with overhead stirrer and condenser arrangement, 200 grams (1.69 m) of bio Succinic acid, 1.0 liter of dry Ethyl alcohol and 5-8 drops of concentrated $H_2SO_4$ were charged and heated to reflux for 8 hrs. After 8 hrs the alcohol was distilled off, 500 ml dichloromethane was added, and washed with 450 ml of 10% sodium carbonate solution to get distinctly alkaline pH. The organic layer was washed with water and then dried over anhydrous sodium sulfate. The solvent was removed and the diester product was distilled off under vacuum. The pure diester was collected at 140-145° C. at ~20 mm Hg pressure.

Wt of diester: 285 grams

Purity: >99.0% (GC)

Yield: 95%

Step (2): Reduction of Diester to BDO:
60 grams (2.6 moles) of clean sodium was placed in a 3 liter RB flask fitted with condenser, overhead stirrer, thermo well and an addition funnel. A mild nitrogen flow was maintained to the flask to keep an inert atmosphere. The nitrogen blanket was removed and a solution of 35 grams (0.2 moles) of diethyl succinate in 700 ml dry ethyl alcohol was added from the dropping funnel, as rapidly as possible keeping the reaction under control. If necessary, external cooling may be applied to keep the reaction under control. The reaction mass was then heated to 120-130° C. for 90 minutes till all the sodium dissolved. Then the reaction mass was cooled to room temp and 25 ml of water was cautiously added. The reaction mixture was refluxed for another 30 minutes to get the unreacted ester hydrolyzed (if any) and then 270 ml concentrated hydrochloric acid was added to the cold mixture. The precipitated sodium chloride was filtered off and the filtrate was treated with 300 grams anhydrous potassium carbonate to free it from water. The alcoholic solution was filtered off and the solids were washed with hot alcohol (2×100 ml), the alcohol was removed by distillation. Dry acetone (200-250 ml) was added to the residue, the solids were filtered off and then the acetone was distilled to get the crude BDO. The crude BDO was further distilled under vacuum to get pure fraction at 135-138° C. (20 mm Hg pressure). The weight of BDO obtained in this experiment was 8 gms and the yield was measured to be 45% on the basis of the amount of ester charged.

The biomass derived BDO in this Example can be used in lieu of the BDO used in the process described above.

Example 12

Synthesis of PBT from Recycle PET and BDO from Bio Based Succinic Acid

The purpose of this example was to show that PBT copolymers can be made from biomass-derived BDO.

PET (recycle) 3.5 g (18.23 mmol), ethylene glycol 1.69 g (27.26 mmol) were added to a reactor, and heated to 180° C. under nitrogen atmosphere. At 180° C., the catalyst tetraisopropylorthotitanate (TPT)200 ppm was added and heating was continued to 225-230° C. and kept for 90 minutes. 5.6 g (62.22 mmol) of 1,4-butanediol (BDO) derived from bio Succinic acid was added to the reaction mass and continued the reaction for another 15 minutes with distilling off ethylene glycol and butane diol from the reaction. Vacuum was applied in a stepwise manner starting from 700 mbar to 500, 300, 100, 75, 50, 25, 10, 5.5, 1.5 and finally to less than 1.0 mbar. The molten reaction mass kept at 0.7 to 0.5 mbar for 30 minutes and finally the polymer was drained off the reactor under nitrogen pressure.

The polyester we obtained had an IV of 0.7 dL/g, melting temperature (Tm) 215° C. The polyester had a weight average molecular weight of 57517 and a number average molecular weight of 13969 (Mw/Mn=4.12). The $^1$H NMR of the polyester showed 96.4 mol % butane diol incorporation and 3.6 mol % of residual ethylene glycol incorporation.

In all the examples above where PBT was derived from PET, the process for making the modified polybutylene terephthalate random copolymers exhibited a reduced $CO_2$ emissions index that was more than one, (1) (more than 1 kg of $CO_2$ was reduced for every kg of modified PBT copolymer that was made). The example of PBT made from PET and bio-based BDO illustrates that the $CO_2$ impact can be further reduced by using monomer derived from biomass.

Examples 13 and 14

These examples prove that a mixture of diols (containing EG as one of the diols) can be used to depolymerize PET and then repolymerized again to form PET derived PBT copolymer.

Examples 13 and 14

Small-Scale Process

Mixtures of EG and BDO

Green colored recycle PET pellets were obtained from St. Jude, a supplier in North America. The post consumer recycle PET pellets had an iv specification of 0.68 to 0.78 and a melting point specification of 245 to 255 C. The butanediol was obtained from BASF and had a purity specification of >99.5 wt. %. The TPT catalyst is the commercial Tyzor grade available from Dupont.

The recycle PET pellets were mixed with butanediol and ethylene glycol in a 500 ml reaction kettle as per the recipe shown in Table 9. The temperature of the oil bath (for the reaction kettle) was ramped up from 180 to 255° C. The agitator speed was set at 20 rpm. At this stage, 0.2 ml of TPT catalyst was also added to the reaction mix. The reaction mass achieved an equilibrium temperature (boiling point of mixture) and the diol mixture was refluxed at this temperature for 2 hours. This is known as the PET glycolysis stage.

For the poly stage, the reflux condenser was removed and a vacuum was applied to the reaction kettle. The volatilized solvents were collected in a separate condenser. The speed of the agitator was increased to 220 rpm. The system pressure was brought down to 0.15 Torr (0.199 kPa) by the vacuum pump. The polymer molecular weight increased rapidly at this stage as was evident by the rod climbing of the molten mass. The reaction was stopped after 20 minutes in the poly stage. About 10 gms of the polymer was collected from the reaction kettle for further testing and analysis. Results of tests conducted on the polymer samples include intrinsic viscosity (iv) data, composition of the polymer by NMR analysis and Crystallization data by DSC analysis and they are presented in Table 10.

TABLE 9

Raw material amount details used for the Examples 13 and 14 (PET derived PBT)

| Parameter | Unit | 13 | 14 |
|---|---|---|---|
| Polyester Type | | Reycled PET | Virgin PET |
| Diol:Ester Ratio | | 2.67:1 | 2.67:1 |
| PET Weight | kgs | .10 | .10 |
| BDO Weight | kgs | .019 | .0314 |
| EG Weight | kgs | .073 | .0646 |
| TPT as Ti element | ppm | 174 | 177 |

TABLE 10

Differential scanning calorimetry (DSC), Intrinsic viscosity (IV) and composition data by NMR of the Examples 13-14 and Comparative Example A

| Item | Parameter | Unit | Comparative Example A (Commercial GE PBT 315) | Example 13 | Example 14 |
|---|---|---|---|---|---|
| DSC Data | Melting Point | (° C.) | 222.6 | 176.89 | 180.03 |
| | Crystallization Temp | (° C.) | 168.3 | 136.49 | 99.32 |
| | Glass Transition Temp | (° C.) | 0 | 47.18 | 49.1 |
| | DH fusion | (° C.) | 38.4 | 15.5023 | 23.441 |
| | DH crystallization | (kJ/kg) | 39.9 | 9.5049 | 22.033 |
| Intrinsic Viscosity | Iv | dl/g | 1.2 | 0.7403 | .71 |
| Composition by NMR analysis | EG Repeat Unit | mol % | 0 | 25.2 | 31.4 |
| | DEG Repeat Unit | mol % | 0 | 0 | 0 |
| | BDO Repeat Unit | mol % | 50 | 25.4 | 19.3 |
| | Isophthalic Repeat Unit | mol % | 0 | 1.1 | .8 |
| | Terephthalic Repeat Unit | mol % | 50 | 48.3 | 48.5 |
| | Total Comonomers | | 0 | 26.3 | 32.2 |
| | Total Residual Equivalents | ** | 0 | 52.6 | 64.4 |

** Residual equivalents relative to the total of 100 equivalents of diol and 100 equivalents of diacid groups The examples above show that when the ethylene glycol, diethylene glycol, and isophthalic acid groups in a total amount that is more than 0 and less than or equal to 23 equivalents relative to the total of 100 equivalents of diol and 100 equivalents of diacid groups in the modified polybutylene terephthalate random copolymer, the melting temperature Tm is below the desired amount of 200° C. It is noteworthy that the Tm of compositions shown in Examples 1-9 is more than 200° C. when the ethylene glycol, diethylene glycol, and isophthalic acid groups in a total amount that is more than 0 and less than or equal to 23 equivalents relative to the total of 100 equivalents of diol and 100 equivalents of diacid groups in the modified polybutylene terephthalate random copolymer. These examples prove that one can tailor the crystallinity and the melting point of the PET derived PBT based on the diol ratio used for the transesterification and the repolymerization stage. The glycolysis stage is quite flexible since one can use any diol or mixture of diols to depolymerize the PET. In the transesterification and the repolymerization stage, it is preferred to keep a butanediol rich environment by removing the other diols. By maintaining a butanediol rich environment, one can then obtain a PET derived PBT copolymer with properties similar to that of virgin PBT.

Although the present invention has been described in detail with reference to certain preferred versions thereof, other variations are possible. Therefore, the spirit and scope of the appended claims should not be limited to the description of the versions contained therein.

What is claimed is:

1. A composition comprising a non-yellow modified polybutylene terephthalate, wherein the modified polybutylene terephthalate has an intrinsic viscosity that is more than 0.55 dL/g and wherein the modified polybutylene terephthalate contains 0.1 to 10 mole % of ethylene glycol groups, and 0.1 to 10 mole % diethylene glycol groups, based on 100 mole % of glycol groups in the modified polybutylene terephthalate as part of a mixture of more than 0 and less than or equal to 23 equivalents of a residue selected from the group consisting of isophthalic acid groups, ethylene glycol groups, diethylene glycol groups, and combinations thereof, relative to the total of 100 equivalents of diol groups and 100 equivalents of diacid groups in the modified polybutylene terephthalate, wherein the modified polybutylene terephthalate is made by a process comprising:

(a) reacting a polyethylene terephthalate component selected from the group consisting of polyethylene terephthalate and polyethylene terephthalate copolymers with a diol component selected from the group consisting of ethylene glycol, propylene glycol, and a combination thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in the reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified polybutylene terephthalate containing at least one residue derived from the polyethylene terephthalate component.

2. The composition of claim 1, wherein the ethylene glycol groups are present in an amount ranging from 0.1 wt. % to 2 wt. %.

3. The composition of claim 1, wherein the 1,4-butanediol used to make the modified polybutylene terephthalate is derived from biomass.

4. The composition of claim 3, wherein the biomass is selected from the group consisting of grains and cellulosic containing materials.

5. The composition of claim 1, wherein the composition has a $CO_2$ reduction index that is more than 1.3 kg.

6. The composition of claim 1, wherein the modified polybutylene terephthalate made by the process contains inorganic residues derived from the polyethylene terephthalate component present in the range from more than 0 ppm and up to 1000 ppm, and wherein the inorganic residues are selected from the group consisting of antimony-containing compounds, germanium-containing compounds, titanium-containing compounds, cobalt-containing compounds, tin-containing compounds, aluminum, aluminum salts, alkali metal salts, alkaline earth metal salts, phosphorous-containing compounds and anions, sulfur-containing compounds and anions, and combinations thereof.

7. The composition of claim 1, wherein the modified polybutylene terephthalate made by the process further contains 0.1 to 10 mole % isophthalic acid groups, based on 100 mole % of diacid/diester groups in the modified polybutylene terephthalate.

8. The composition of claim 1, wherein isophthalic acid and ethylene glycol groups are present in an amount that is more than 0.85 wt. %.

9. The composition of claim 1, wherein the modified polybutylene terephthalate made by the process has an intrinsic viscosity of 0.690 to 0.805 dL/g.

10. The composition of claim 1, wherein the modified polybutylene terephthalate made by the process has an intrinsic viscosity of 1 to 1.3 dL/g.

11. The composition of claim 1, wherein the mixture of ethylene glycol groups, diethylene glycol groups and isophthalic acid groups ranges from 3 to 23 equivalents, relative to the total of 100 equivalents of diol and 100 equivalents of diacid groups in the modified polybutylene terephthalate.

12. The composition of claim 1, wherein the mixture of ethylene glycol groups, diethylene glycol groups and isophthalic acid groups ranges from 3 to 10 equivalents, relative to the total of 100equivalents of diol and 100 equivalents of diacid groups in the modified polybutylene terephthalate.

13. The composition of claim 1, wherein the mixture of ethylene glycol groups, diethylene glycol groups and isophthalic acid groups ranges from 10 to 23 equivalents, relative to the total of 100 equivalents of diol and 100 equivalents of diacid groups in the modified polybutylene terephthalate.

14. The composition of claim 6, wherein the inorganic residues are present in an amount ranging from 250 to 1000 ppm.

15. The composition of claim 1, wherein the modified polybutylene terephthalate made by the process further contains a cyclohexanedimethanol group selected from the group consisting of the cis isomer of 1,3-cyclohexanedimethanol, the cis isomer of 1,4-cyclohexanedimethanol, the trans isomer of 1,3-cyclohexanedimethanol, the trans isomer of 1,4-cyclohexanedimethano 1 and combinations thereof.

16. The composition of claim 15, wherein the cyclohexanedimethanol group is present in the modified polybutylene terephthalate in an amount ranging from 0.1 to 10 mole %, based on the total moles of diol.

17. The composition of claim 1, wherein the modified polybutylene terephthalate made by the process has a melting temperature of 200 to 223° C.

18. The composition of claim 1, wherein the modified polybutylene terephthalate made by the process has a melting temperature of 211 to 223° C.

19. The composition of claim 1, wherein the modified polybutylene terephthalate made by the process has an intrinsic viscosity of 0.55 to 1.3 dL/g.

20. The composition of claim 1, wherein the modified polybutylene terephthalate made by the process has an intrinsic viscosity of 1.5 dL/g or higher.

21. The composition of claim 1, wherein the modified polybutylene terephthalate made by the process has at least one of a flexural modulus of at least 1000 MPa, a tensile strength at yield of at least 30 MPa, a tensile elongation at yield of at least 2%, a notched Izod strength of at least 20 J/m, and a heat deflection temperature of 45° C. to 70° C. at 1.82 MPa for 3.2 mm bars.

22. The composition of claim 1, wherein the process further comprises increasing the molecular weight of the polymer obtained in step (c) by subjecting the polymer formed in step (c) to solid-state polymerization.

23. The composition of claim 1, wherein excess 1,4-butane diol, ethylene glyco 1, and tetrahydro furan are removed during step (b) of the process.

24. The composition of claim 1, wherein 1,4-butane diol is refluxed back into the reactor, and a component selected from the group consisting of excess 1,4-butane diol, ethylene glycol, propylene glycol, tetrahydrofuran, and combinations thereof is removed during step (b) of the process.

25. The composition of claim 1, wherein the 1,4-butane diol is used in step (a) of the process in a molar excess amount ranging from 1.1 to 5.

* * * * *

UNITED STATES PATENT AND TRADEMARK OFFICE
CERTIFICATE OF CORRECTION

PATENT NO. : 8,088,834 B2  Page 1 of 1
APPLICATION NO. : 12/874786
DATED : January 3, 2012
INVENTOR(S) : Parminder Agarwal et al.

It is certified that error appears in the above-identified patent and that said Letters Patent is hereby corrected as shown below:

Title Page, Item (75), Inventors,

Delete "Robert Russell Galucci" and insert therefor --Robert Russell Gallucci--.

Signed and Sealed this
Thirteenth Day of March, 2012

David J. Kappos
*Director of the United States Patent and Trademark Office*

UNITED STATES PATENT AND TRADEMARK OFFICE
CERTIFICATE OF CORRECTION

PATENT NO.        : 8,088,834 B2
APPLICATION NO.   : 12/874786
DATED             : January 3, 2012
INVENTOR(S)       : Parminder Agarwal et al.

It is certified that error appears in the above-identified patent and that said Letters Patent is hereby corrected as shown below:

Title Page, Item (75), Inventors,

Delete "Sandeep Kumar Dhawan" and insert therefor --Sandeep Dhawan--.

Signed and Sealed this
Twenty-second Day of May, 2012

David J. Kappos
*Director of the United States Patent and Trademark Office*